US009037677B2

(12) United States Patent
Lee et al.

(10) Patent No.: US 9,037,677 B2
(45) Date of Patent: *May 19, 2015

(54) UPDATE PROTOCOL FOR CLIENT-SIDE ROUTING INFORMATION

(75) Inventors: Juchang Lee, Seoul (KR); Jaeyun Noh, Seoul (KR); Chulwon Lee, Seoul (KR); Michael Muehle, Walldorf (DE); Alexander Schroeder, Berlin (DE); Marco Paskamp, Hansestadt Stendal (DE); Sang Kyun Cha, Seoul (KR)

(73) Assignee: SAP SE, Walldorf (DE)

( * ) Notice: Subject to any disclaimer, the term of this patent is extended or adjusted under 35 U.S.C. 154(b) by 415 days.

This patent is subject to a terminal disclaimer.

(21) Appl. No.: 13/449,081

(22) Filed: Apr. 17, 2012

(65) Prior Publication Data

US 2013/0275550 A1    Oct. 17, 2013

(51) Int. Cl.
*G06F 15/16* (2006.01)
*G06F 17/30* (2006.01)

(52) U.S. Cl.
CPC ............... *G06F 17/30545* (2013.01)

(58) Field of Classification Search
CPC .................. G06F 15/16; G06F 17/30
USPC ........................................................ 709/217
See application file for complete search history.

(56) References Cited

U.S. PATENT DOCUMENTS

| 7,720,813 | B2 * | 5/2010 | Ellsworth et al. | 707/634 |
| 8,365,153 | B2 * | 1/2013 | Chen et al. | 717/140 |
| 2006/0074937 | A1 * | 4/2006 | Bird et al. | 707/100 |
| 2012/0290582 | A1 * | 11/2012 | Oikarinen | 707/741 |

* cited by examiner

*Primary Examiner* — Glenton B Burgess
*Assistant Examiner* — Imran Moorad
(74) *Attorney, Agent, or Firm* — Buckley, Maschoff & Talwalkar LLC

(57) ABSTRACT

A system includes reception of a first query from a client device at a first database node of a database instance, determination of routing information associated with the first query, compilation of the first query at the first database node to generate first compiled code, transmission of the first compiled code and the routing information to the client device, reception of the compiled code from the client device at a second database node, determination, at the second database node, that data associated with the compiled query is associated with a third database node, transmission of the compiled code from the second database node to the third database node, reception of query results at the second database node from the third database node, and transmission of the query results and an indication to update the routing information from the second database node to the client device.

14 Claims, 16 Drawing Sheets

UPDATE PROTOCOL FOR CLIENT-SIDE ROUTING INFORMATION

BACKGROUND

A distributed database system includes two or more database nodes. Each node executes one or more database processes and is associated with respective data storage. To retrieve data from a distributed database, a client application transmits a query to a database node which is designated to receive such queries. The designated database node determines whether it should execute the query or route the query to another database node for execution, and then executes or routes the query based on the determination.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
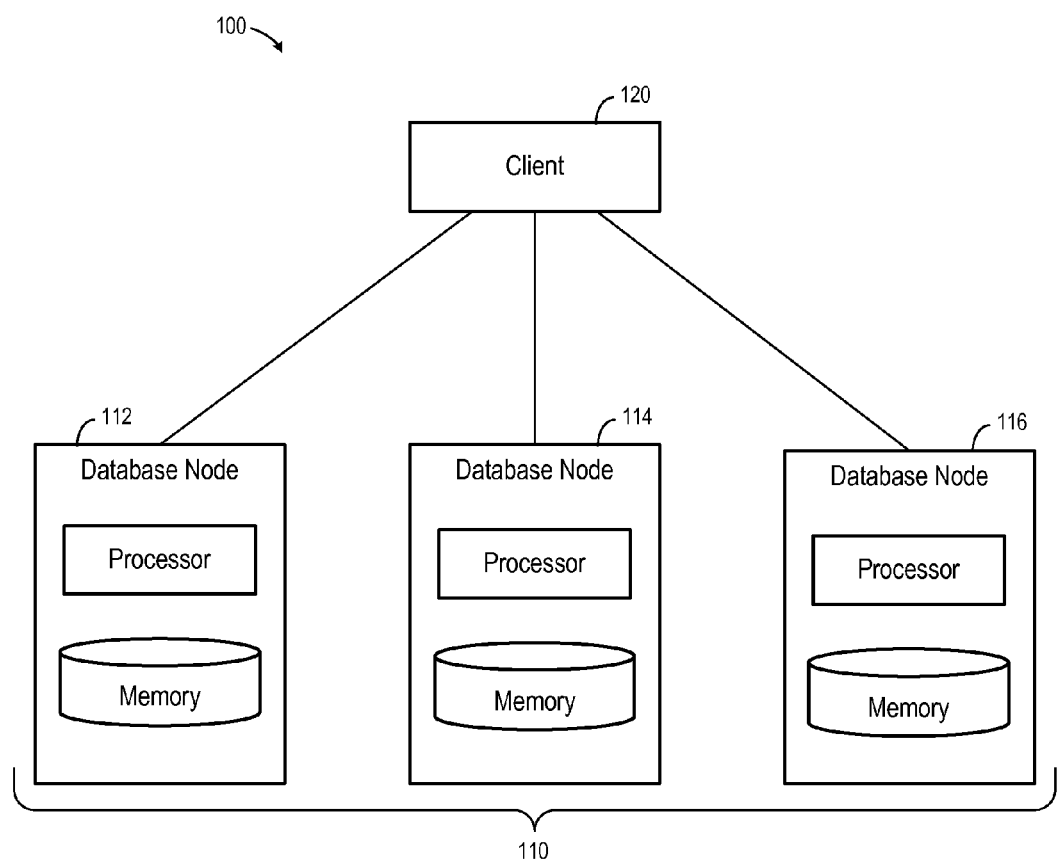
FIG. 1 is a block diagram of a system according to some embodiments.

FIG. 1 is a block diagram of system 100. System 100 represents a logical architecture for describing some embodiments, and actual implementations may include more, fewer and/or different components arranged in any manner. The elements of system 100 may represent software elements, hardware elements, or any combination thereof. For example, system 100 may be implemented using any number of computing devices, and one or more processors within system 100 may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

System 100 includes database instance 110, which is a distributed database including database nodes 112, 114 and 116. Each of database nodes 112, 114 and 116 includes at least one processor and a memory device. The memory devices of database nodes 112, 114 and 116 need not be physically segregated as illustrated in FIG. 1, rather, FIG. 1 is intended to illustrate that each of database nodes 112, 114 and 116 is responsible for managing a dedicated portion of physical memory, regardless of where that physical memory is located. The data stored within the memories of database nodes 112, 114 and 116, taken together, represent the full database of database instance 110.

In some embodiments, the memory of database nodes 112, 114 and 116 is implemented in Random Access Memory (e.g., cache memory for storing recently-used data) and one or more fixed disks (e.g., persistent memory for storing their respective portions of the full database). Alternatively, one or more of nodes 112, 114 and 116 may implement an "in-memory" database, in which volatile (e.g., non-disk-based) memory (e.g., Random Access Memory) is used both for cache memory and for storing its entire respective portion of the full database. In some embodiments, the data of the full database may comprise one or more of conventional tabular data, row-based data, column-based data, and object-based data. Database instance 100 may also or alternatively support multi-tenancy by providing multiple logical database systems which are programmatically isolated from one another.

According to some embodiments, database nodes 112, 114 and 116 each execute a database server process to provide the data of the full database to database applications. More specifically, database instance 110 may communicate with one or more database applications executed by client 120 over one or more interfaces (e.g., a Structured Query Language (SQL)-based interface) in order to provide data thereto. Client 120 may comprise one or more processors and memory storing program code which is executable by the one or more processors to cause client 120 to perform the actions attributed thereto herein.

Client 120 may thereby comprise an application server executing database applications to provide, for example, business reporting, inventory control, online shopping, and/or any other suitable functions. The database applications may, in turn, support presentation applications executed by end-user devices (e.g., desktop computers, laptop computers, tablet computers, smartphones, etc.). Such a presentation application may simply comprise a Web browser to access and display reports generated by a database application.

The data of database instance 110 may be received from disparate hardware and software systems, some of which are not interoperational with one another. The systems may comprise a back-end data environment employed in a business or industrial context. The data may be pushed to database instance 110 and/or provided in response to queries received therefrom.

Database instance 110 and each element thereof may also include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Figure 2:
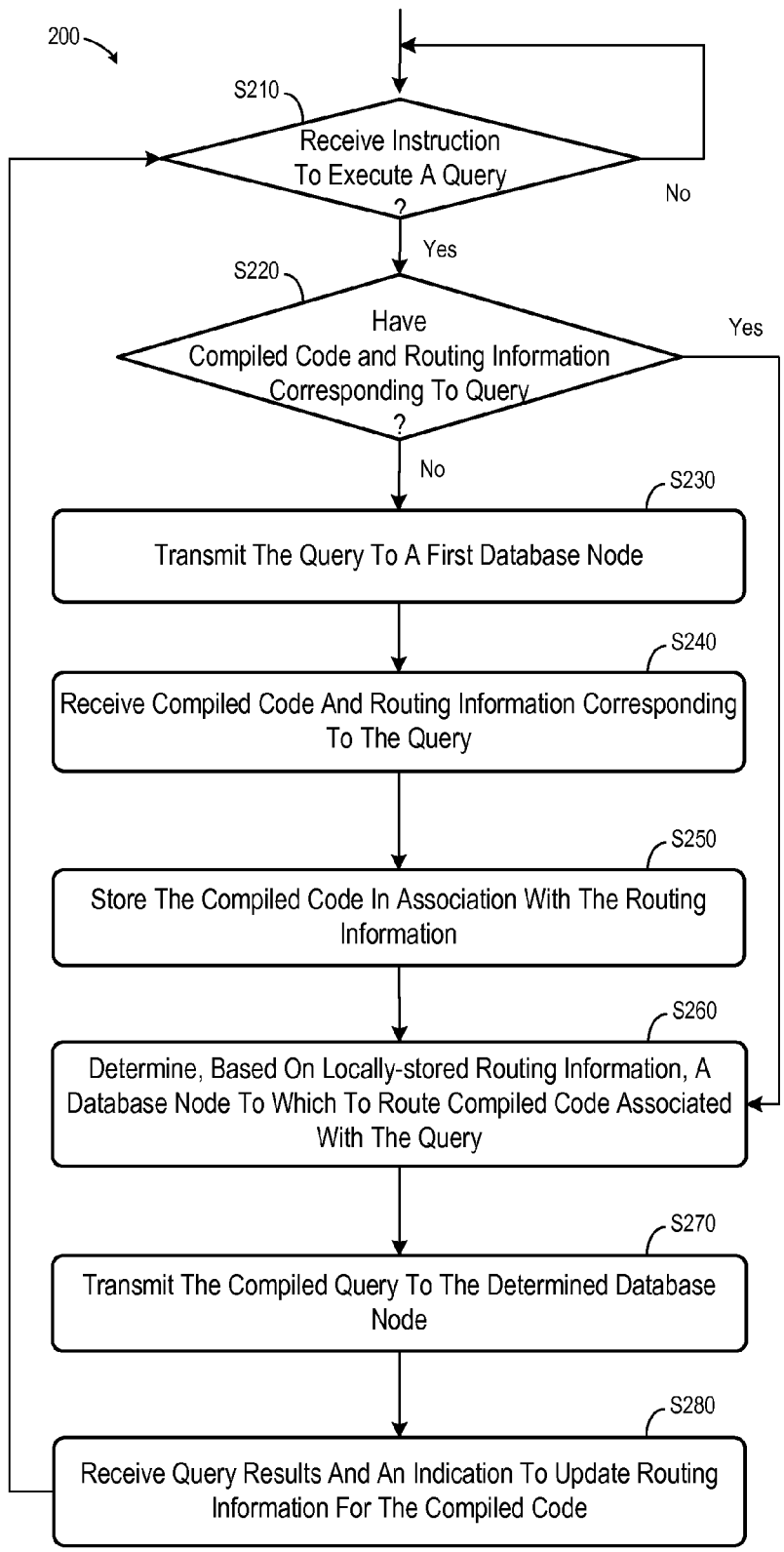
FIG. 2 is a flow diagram of a process according to some embodiments.

FIG. 2 comprises a flow diagram of process 200 according to some embodiments. Process 200 may be executed by a client device of a distributed database instance, such as but not limited to an application server, according to some embodiments. Process 200 and all other processes mentioned herein may be embodied in computer-executable program code read from one or more non-transitory computer-readable media, such as a floppy disk, a CD-ROM, a DVD-ROM, a Flash drive, a fixed disk and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Flow initially cycles at S210 until an instruction to execute a query is received. The instruction may be generated by internal processes of an application executing on an application server and/or received from a user device at S210.

Once a query is received, it is determined at S220 whether the client possesses compiled code corresponding to the query. In one example of S220, a client checks a locally-stored library (e.g., an SQLDBC client library) to determine whether the compiled code resides in the library.

Figure 3:
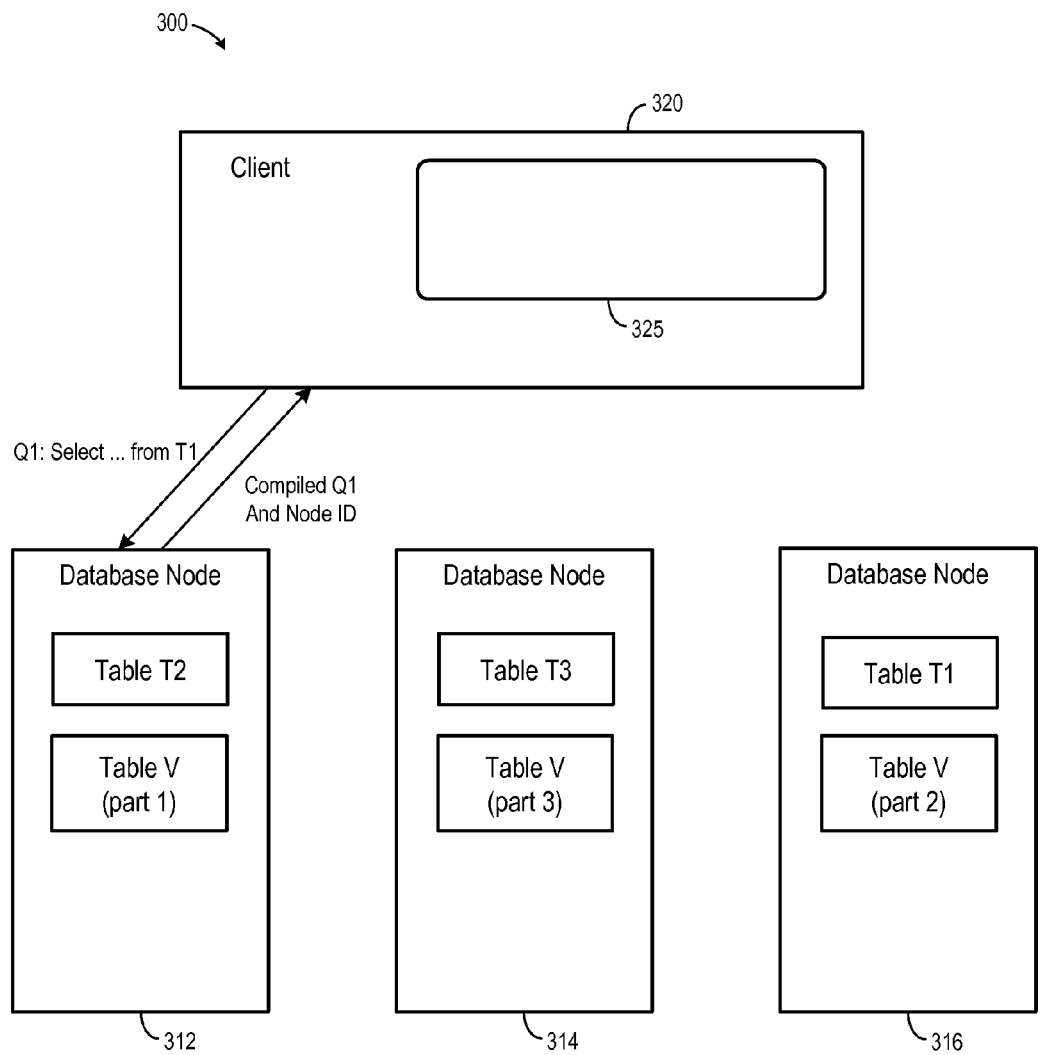
FIG. 3 is a block diagram illustrating operation of a system according to some embodiments.

FIG. 3 illustrates system 300 according to some embodiments. For purposes of the present example, it is assumed that client 320 executes process 200, and that library 325 of client 320 initially contains no compiled query code. Accordingly, the query to be executed is transmitted to a first database node at S230.

In the FIG. 3 example, the query "Select . . . from T1" is transmitted to database node 312 at S230. The query may conform to any suitable compilable query language that is or becomes known, such as, for example, SQL. Client 320 may transmit the query by calling a "Prepare Query" API exposed by database node 312. According to some embodiments, one or both of database nodes 314 and 316 also expose the Prepare Query API and therefore the query could alternatively be transmitted to either of these nodes at S230.

Database node 312 may proceed to compile the query by executing a compiler associated with the language of the query, resulting in compiled code. The compiled code is executable by any database node to execute the query on the data managed by the database node.

Database node 312 may also determine a database node that is associated with the query. The determined database node may be a database node that is suited to execute the query. For example, if the query queries Table T1 of the database instance, the determined database node may be a database node that manages and/or stores Table T1 (i.e., node 316).

The compiled code is transmitted to the client and received at S240. Also transmitted is routing information usable by the client to determine a database node to which to transmit the compiled code for execution thereof. In the present example, the routing information comprises an identifier of the database node which was determined to be associated with the query (i.e., node 316). FIG. 3 illustrates transmission of the query to database node 312 at S230 and reception of the compiled code and an identifier of the database node at S240.

Figure 4:
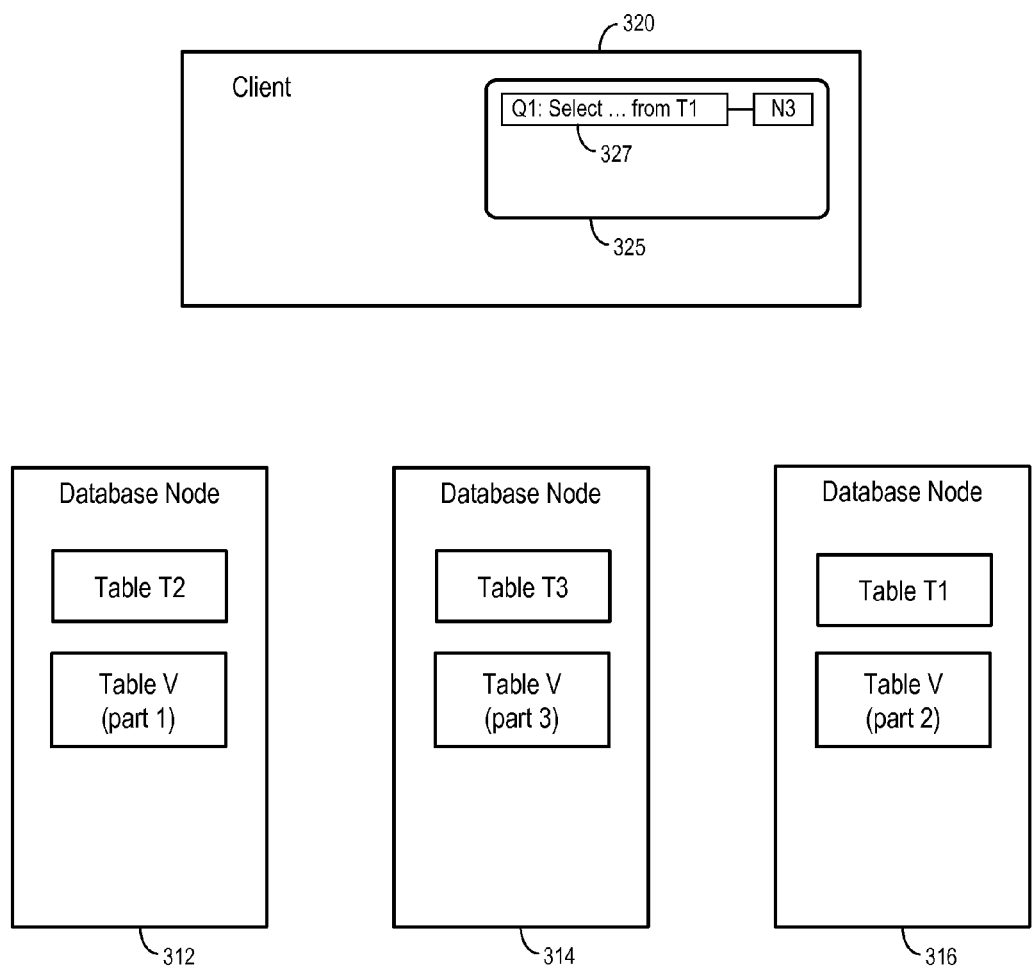
FIG. 4 is a block diagram illustrating operation of a system according to some embodiments.

The compiled code is stored in association with the routing information at S250. FIG. 4 illustrates storage of the compiled code 327 in association with the identifier (i.e., "N3") in library 325 according to some embodiments. In this regard, "in association" indicates that the identifier may be located in memory by reference to the query Q1 and/or to the corresponding compiled code.

Next, at S260, the locally-stored routing information is used to determine a database node to which to route the compiled code for execution of the query. S260 may be performed immediately after receiving the compiled code from a database node, or at another later time at which the determination at S220 is positive.

Figure 5:
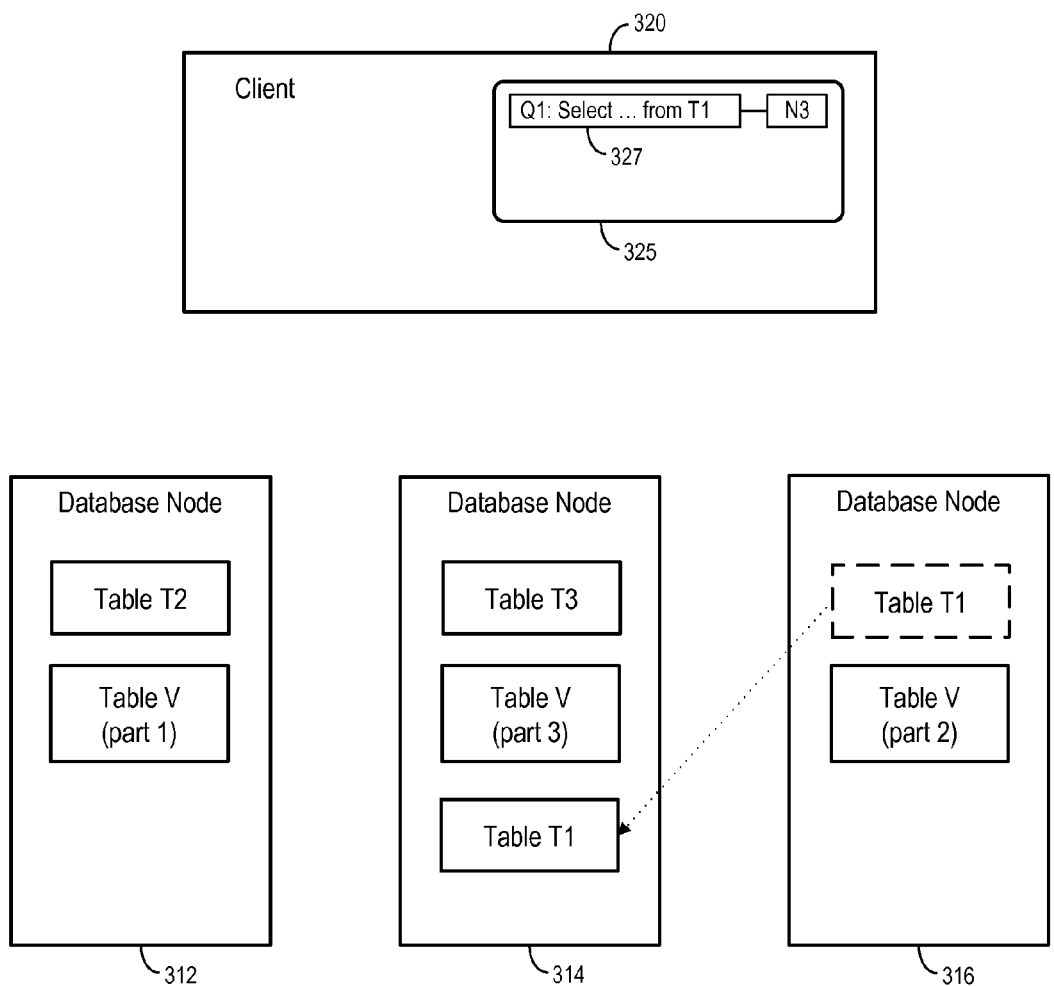
FIG. 5 is a block diagram illustrating operation of a system according to some embodiments.

According to the present example, the identifier N3 is used to determine database node 316 at S260. However, it will be assumed that, at some time since the compiled code and routing information were first stored in library 325, Table T1 was moved from node 316 to node 314, as shown in FIG. 5. For example, a database administrator may re-author the database instance to move Table T1 as shown.

Figure 6:
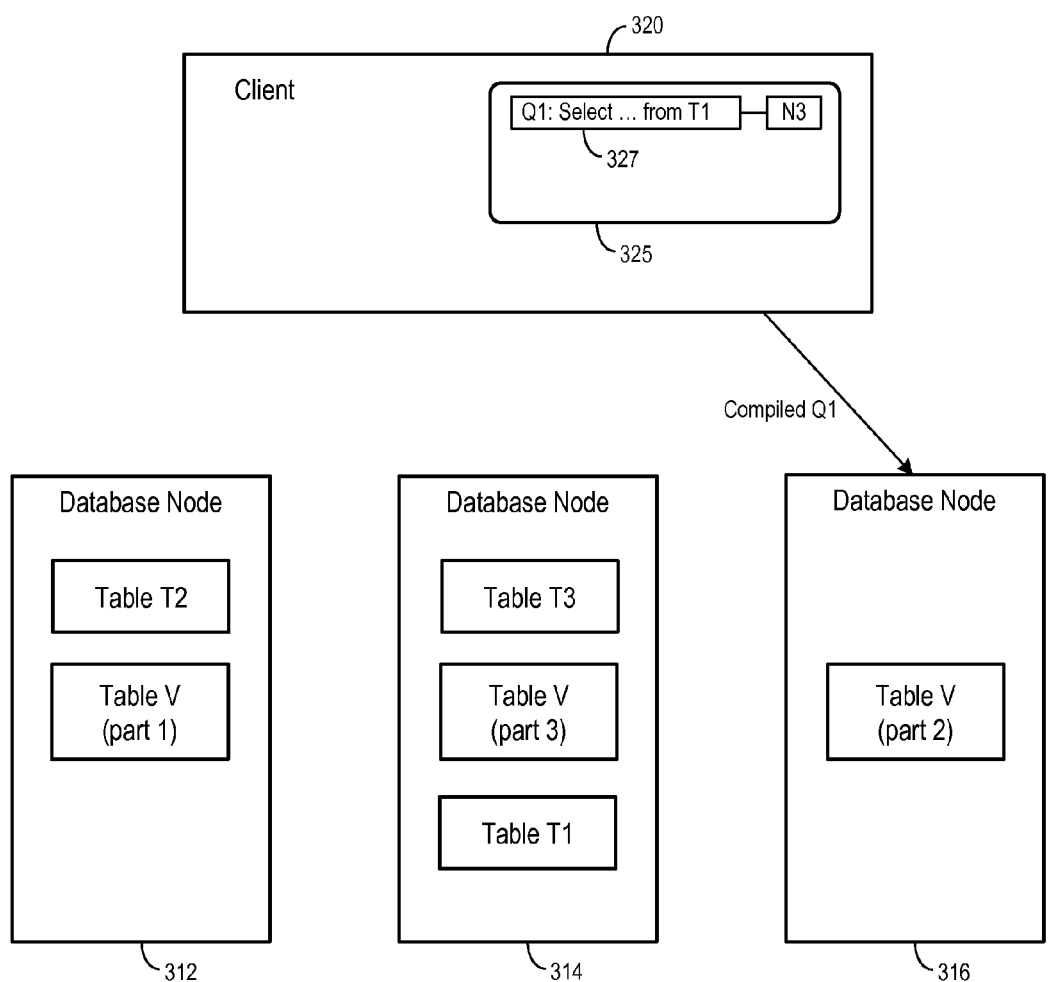
FIG. 6 is a block diagram illustrating operation of a system according to some embodiments.

At S270, client 320 transmits the compiled query to the identified database node by calling an "Execute Query" API exposed by database node 316 and passing the compiled code as a parameter thereof. FIG. 6 illustrates this transmission according to some embodiments. As shown, Table T1 does not reside in database node 316 at the time the transmission is received.

Figure 7:
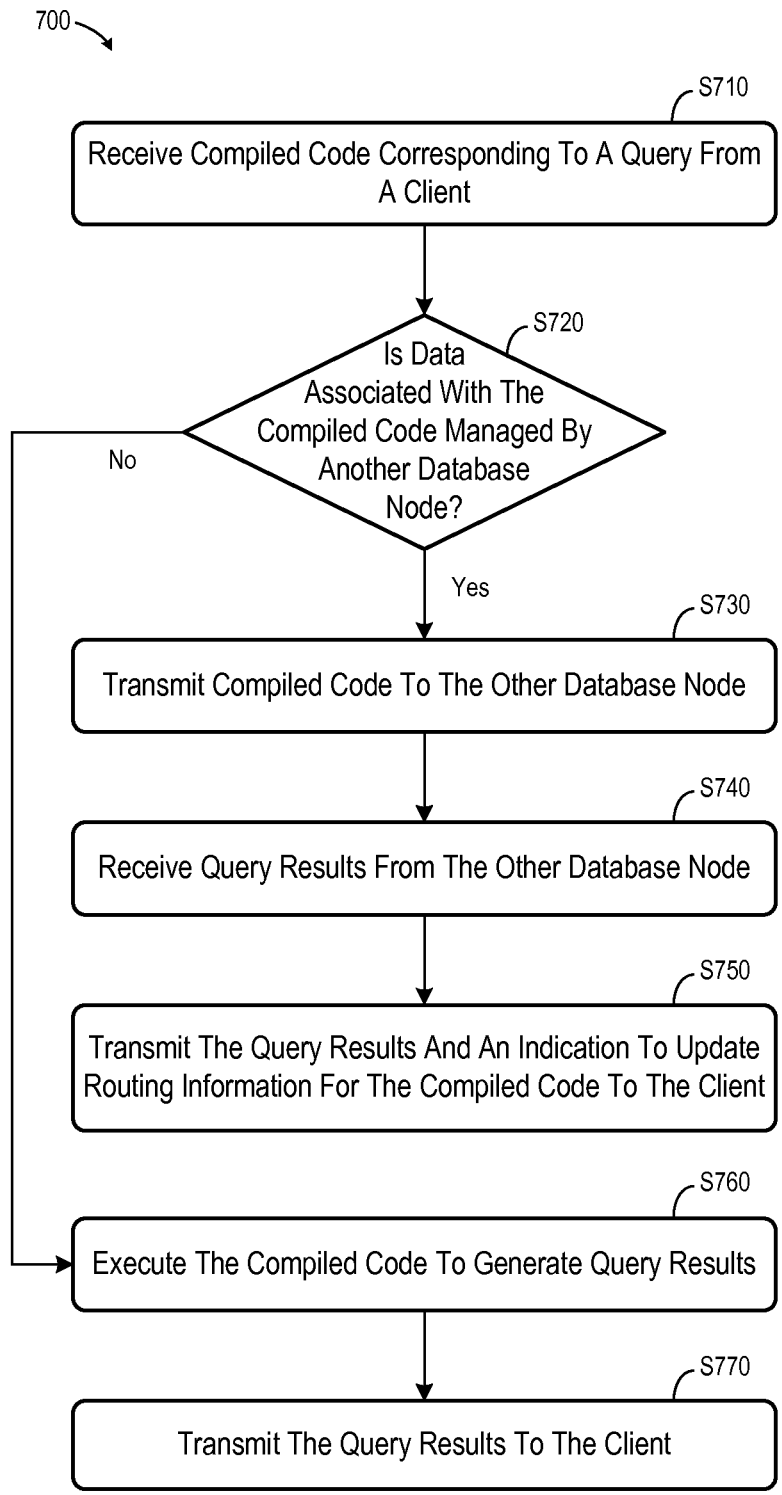
FIG. 7 is a flow diagram of a process according to some embodiments.

Process 700 of FIG. 7 may be executed by any database node of a distributed database instance according to some embodiments. Process 700 will be described as performed by node 316, in some embodiments, in response to receipt of compiled code as illustrated in FIG. 6.

Compiled code corresponding to a query is received from a client at S710. At S720, it is determined whether data associated with the compiled code is managed by another database node. In the present example, the compiled code is associated with query Q1, which in turn is associated with Table T1. Since Table T1 has moved to node 314, flow proceeds from S720 to S730.

Figure 8:
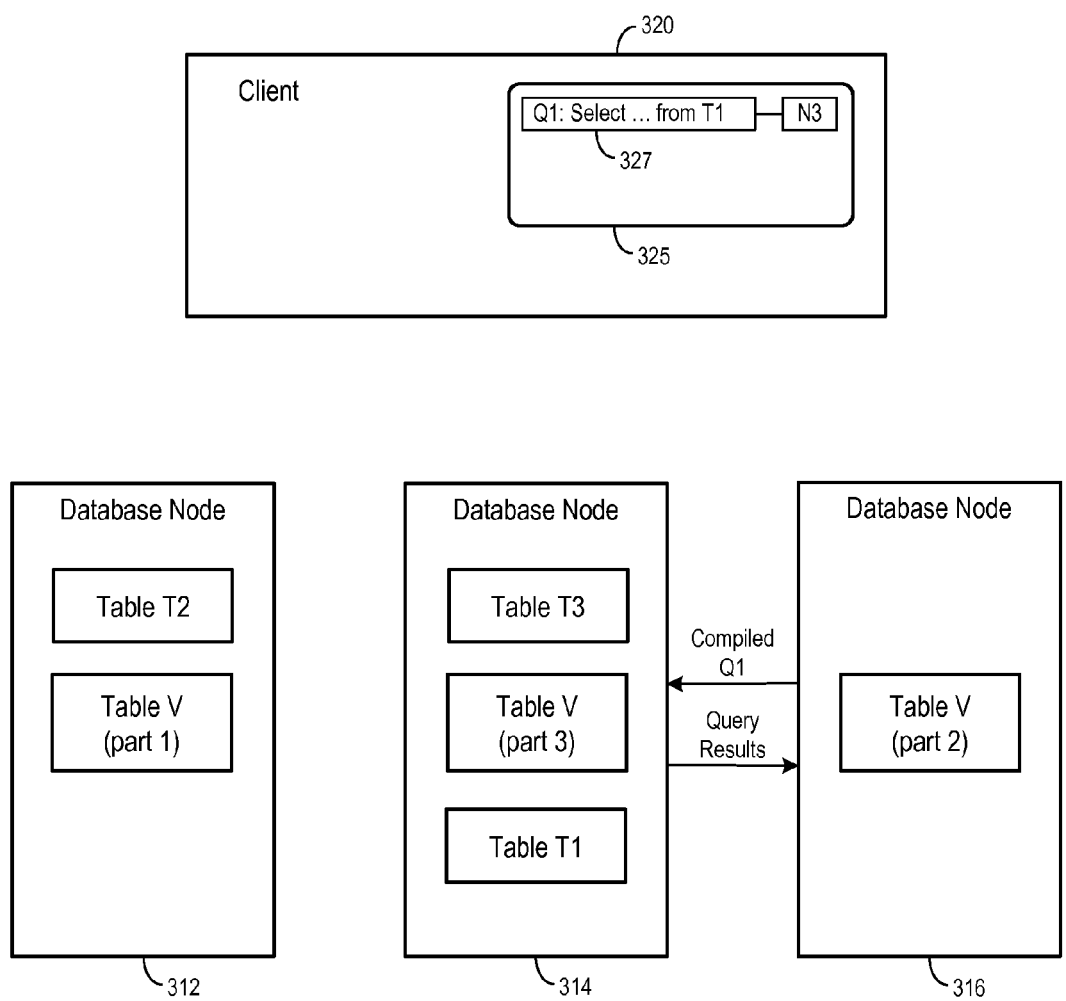
FIG. 8 is a block diagram illustrating operation of a system according to some embodiments.

The compiled code is transmitted to the database node which manages the relevant data at S730, as shown in FIG. 8. Again, the compiled query may be transmitted to a database node by calling the "Execute Query" API exposed by the database node 316 and passing the compiled code as a parameter thereof. In response, and as also shown in FIG. 8, query results are received from the other node at S740.

Figure 9:
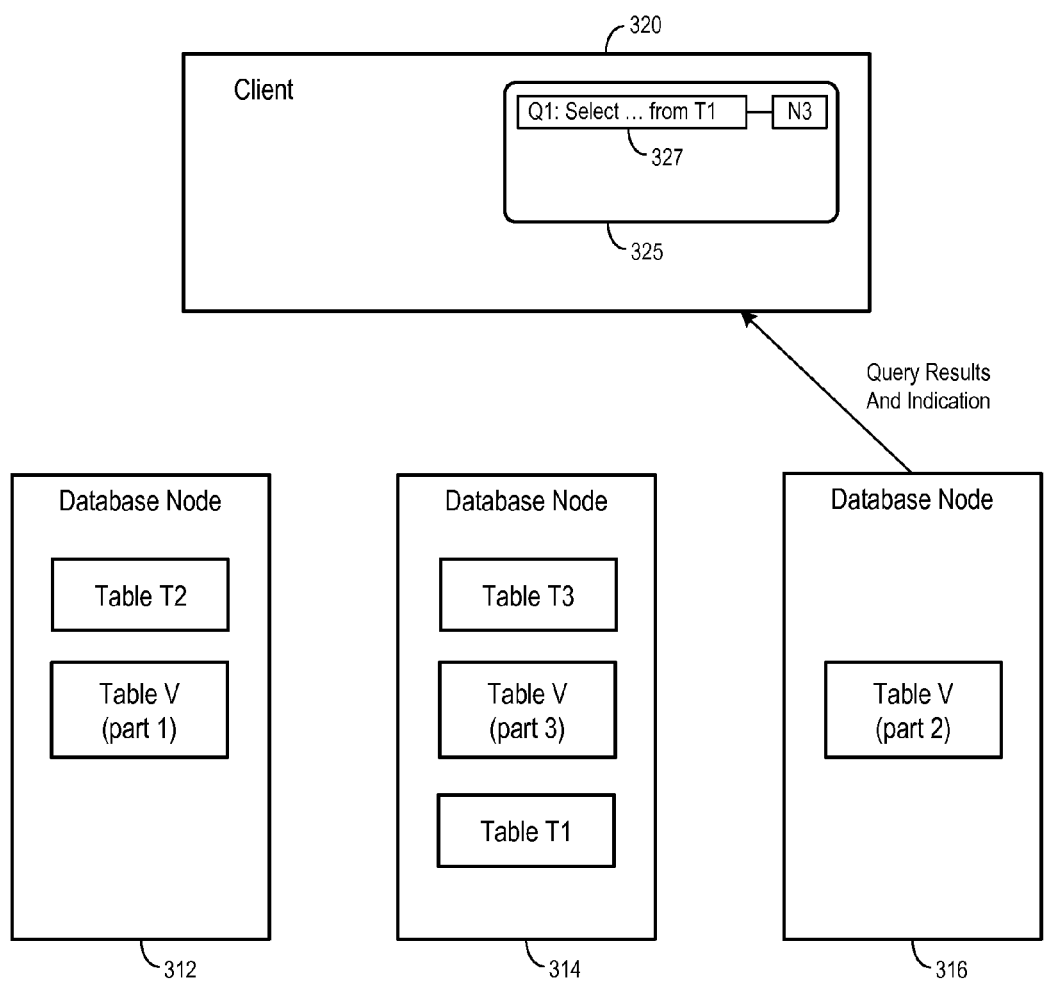
FIG. 9 is a block diagram illustrating operation of a system according to some embodiments.

Next, at S750, the query results are transmitted back to the client as shown in FIG. 9. Also transmitted to the client at S750 is an indication to update routing information for the compiled code. According to some embodiments, the indication is an invalidation flag returned with the query results. In some embodiments, the indication comprises updated routing information. For example, with respect to the FIG. 9 example, the indication may be an identifier of database node 314 (e.g., "N2").

Figure 10:
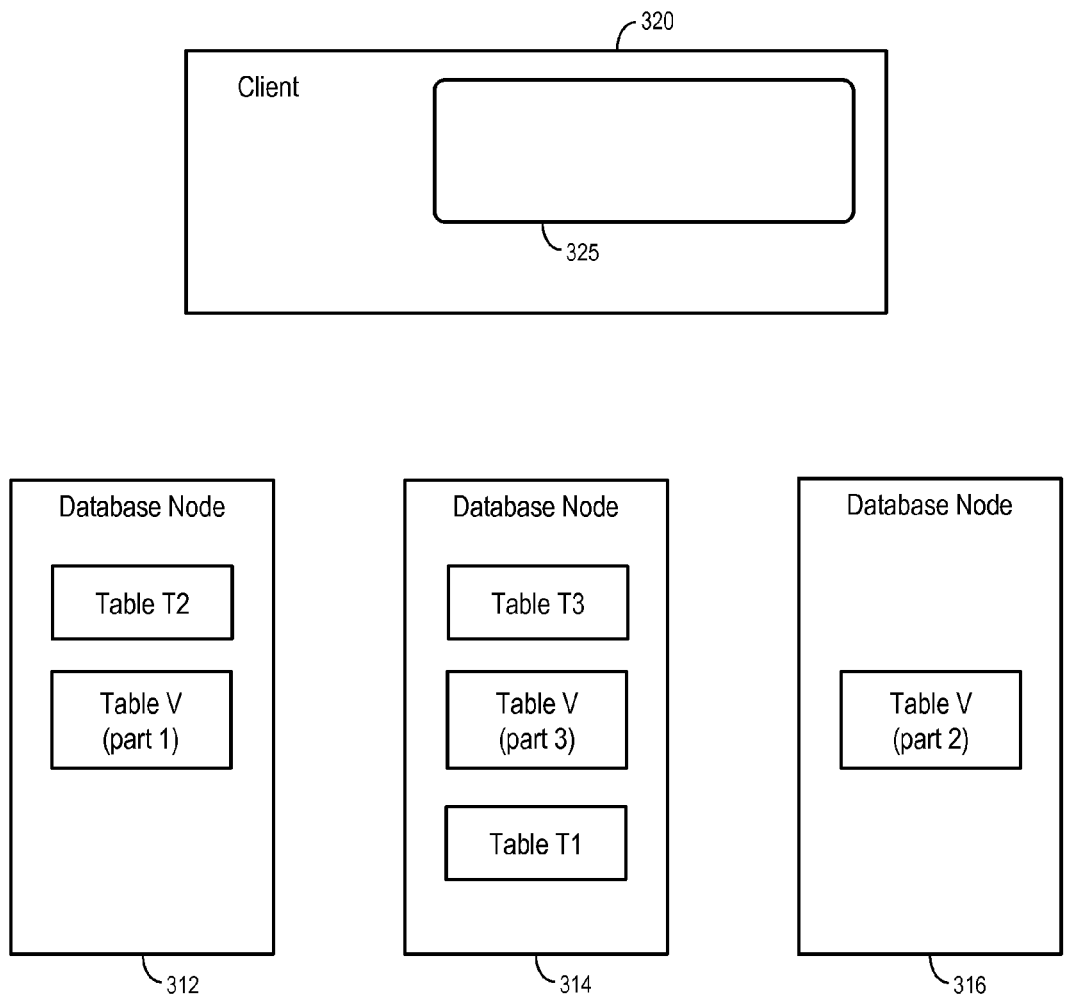
FIG. 10 is a block diagram illustrating operation of a system according to some embodiments.

The query results and indication are received at S280 of process 200. In a case that the indication is an invalidation flag, client 320 may delete the associated routing information, and perhaps also the associated compiled code, from library 325 as shown in FIG. 10. Accordingly, upon receiving a next instruction to execute the corresponding query, client 320 again executes S230 through S250 to obtain updated routing information.

If the received indication itself includes updated routing information, client 320 may simply update the routing information associated with the compiled code within library 325.

Figure 11:
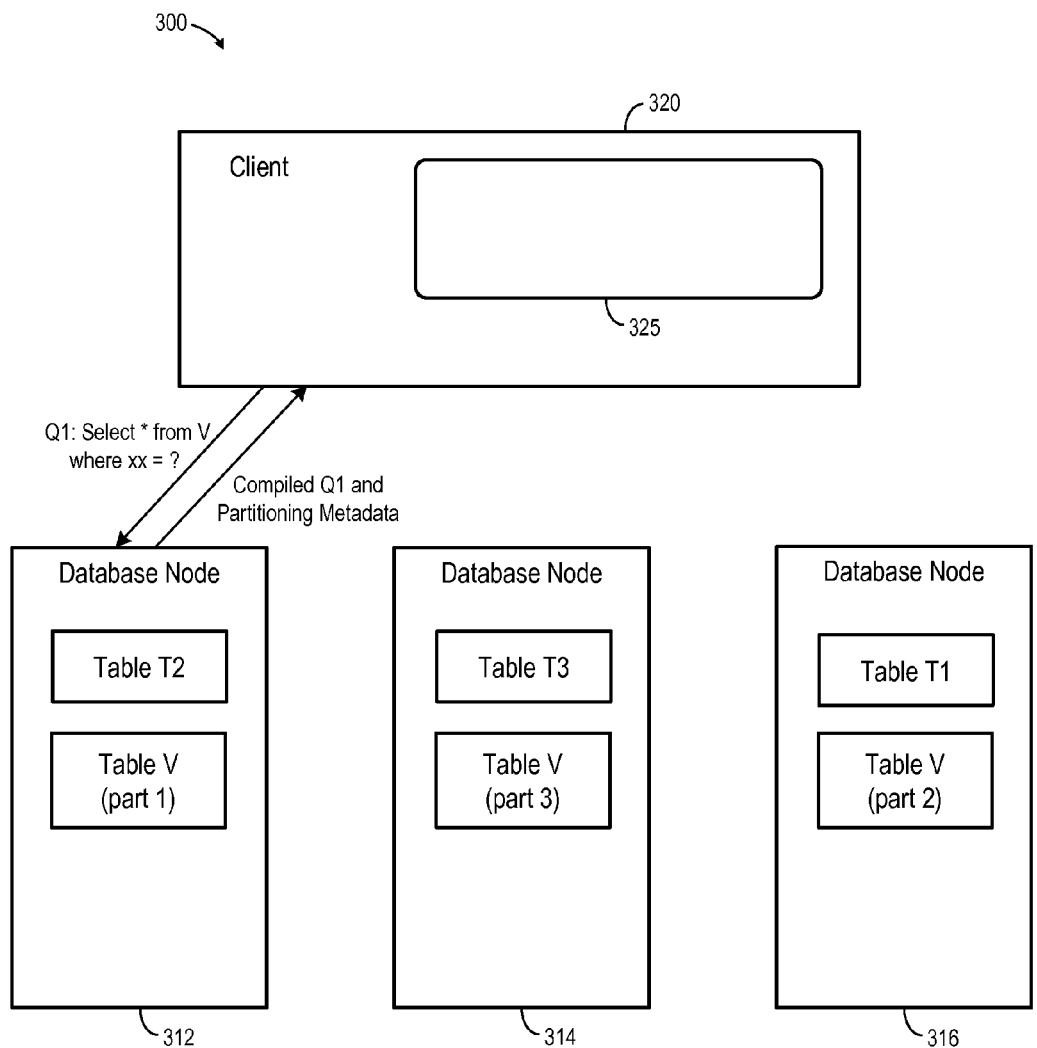
FIG. 11 is a block diagram illustrating operation of a system according to some embodiments.

Another example of some embodiments will now be described with respect to FIGS. 11 through 15. As shown in FIG. 11, client 320 may transmit the query "Select * from V where x=?" to database node 312 at S230, perhaps by calling the above-mentioned "Prepare Query" API exposed by database node 312.

Database node 312 compiles the query and determines routing information associated with a database table specified by the query. As shown, Table V is partitioned among database nodes 312, 314 and 316. The routing information may comprise partitioning metadata, which is used to identify a partition of the database table to which particular table key values belong. The partitioning metadata may also specify database nodes to which each partition of the database table belongs.

According to some embodiments, the partitioning metadata includes, but is not limited to, a partitioning criteria function having input parameters associated with table keys, and, for each partition of the database table specified in the query, an identifier of a database node storing the partition.

The compiled query and the routing information are transmitted to the client and received at S240 as also illustrated in FIG. 11. The partitioning metadata may allow the client to route subsequent executions of the query to an appropriate database node (i.e., to the database node which owns the desired portion of the database table).

Figure 12:
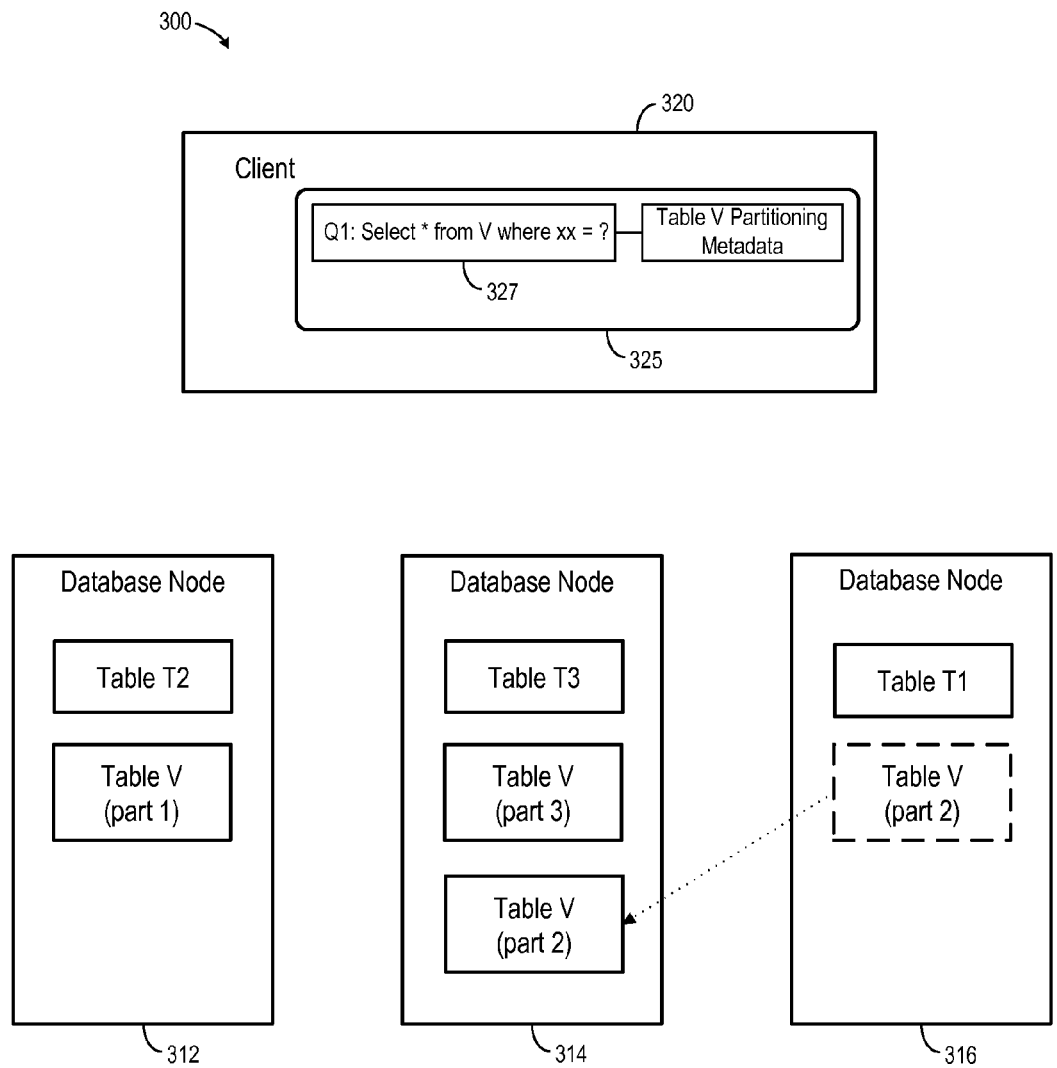
FIG. 12 is a block diagram illustrating operation of a system according to some embodiments.

Again, the compiled code is stored in association with the routing information at S250. FIG. 12 illustrates storage of the compiled code 327 in association with the routing information in library 325 according to some embodiments. As also illustrated in FIG. 12, it will be assumed that, at some time since the compiled code and routing information were first stored in library 325, and prior to S260, partition 2 of Table V was moved from node 316 to node 314.

Next, at S260, the locally-stored routing information is used to determine a database node to which to route the compiled code for execution of the query. According to some embodiments, a partitioning criteria function of the partitioning metadata is evaluated at S260 using key values of the query as input parameters. The function outputs an indication of a partition of Table V which includes the data sought by the query. The partitioning metadata also includes information indicating the database node which stores the partition. Accordingly, this database node is determined at S260.

Figure 13:
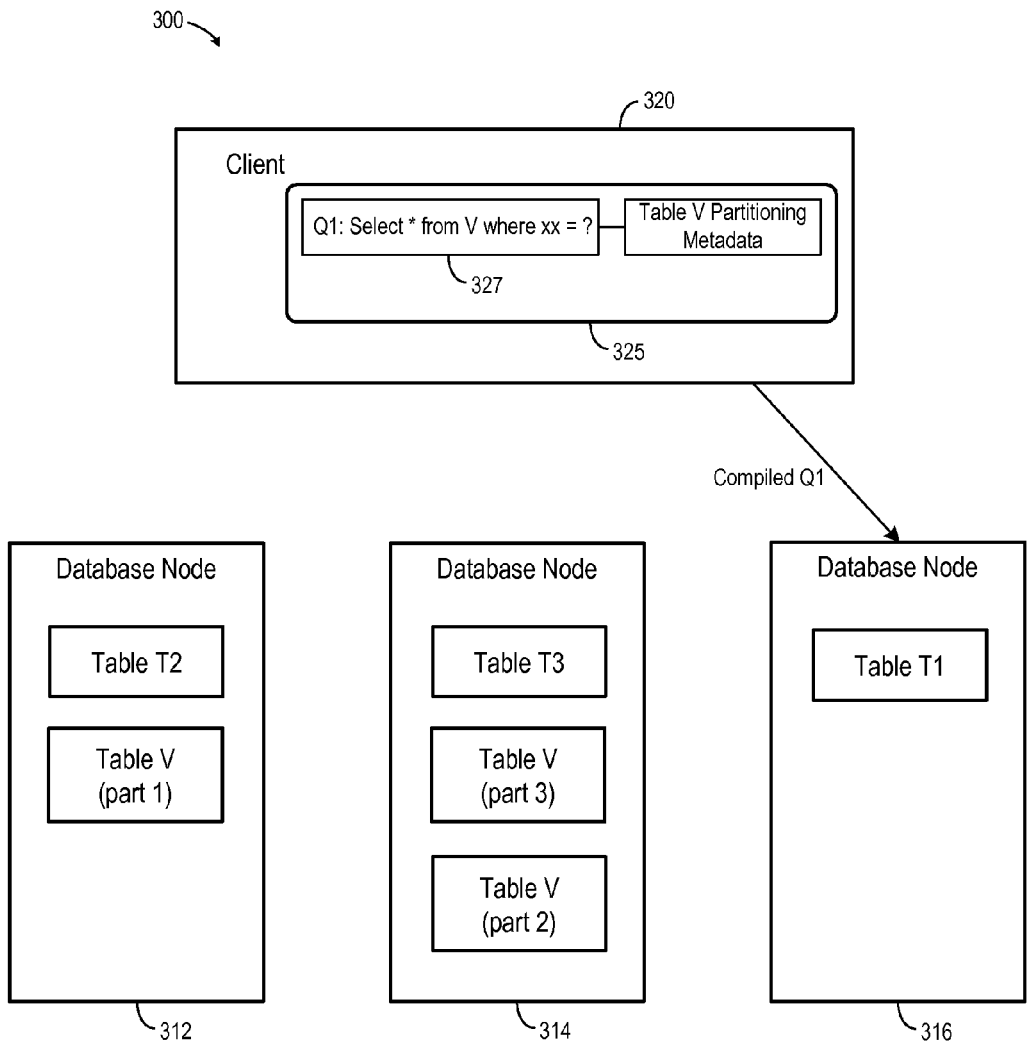
FIG. 13 is a block diagram illustrating operation of a system according to some embodiments.

At S270, client 320 transmits the compiled query to the identified database node by calling an "Execute Query" API exposed by database node 316 and passing the compiled code as a parameter thereof FIG. 13 illustrates this transmission according to some embodiments. As shown, partition 2 of Table V does not reside in database node 316 at the time the transmission is received.

Figure 14:
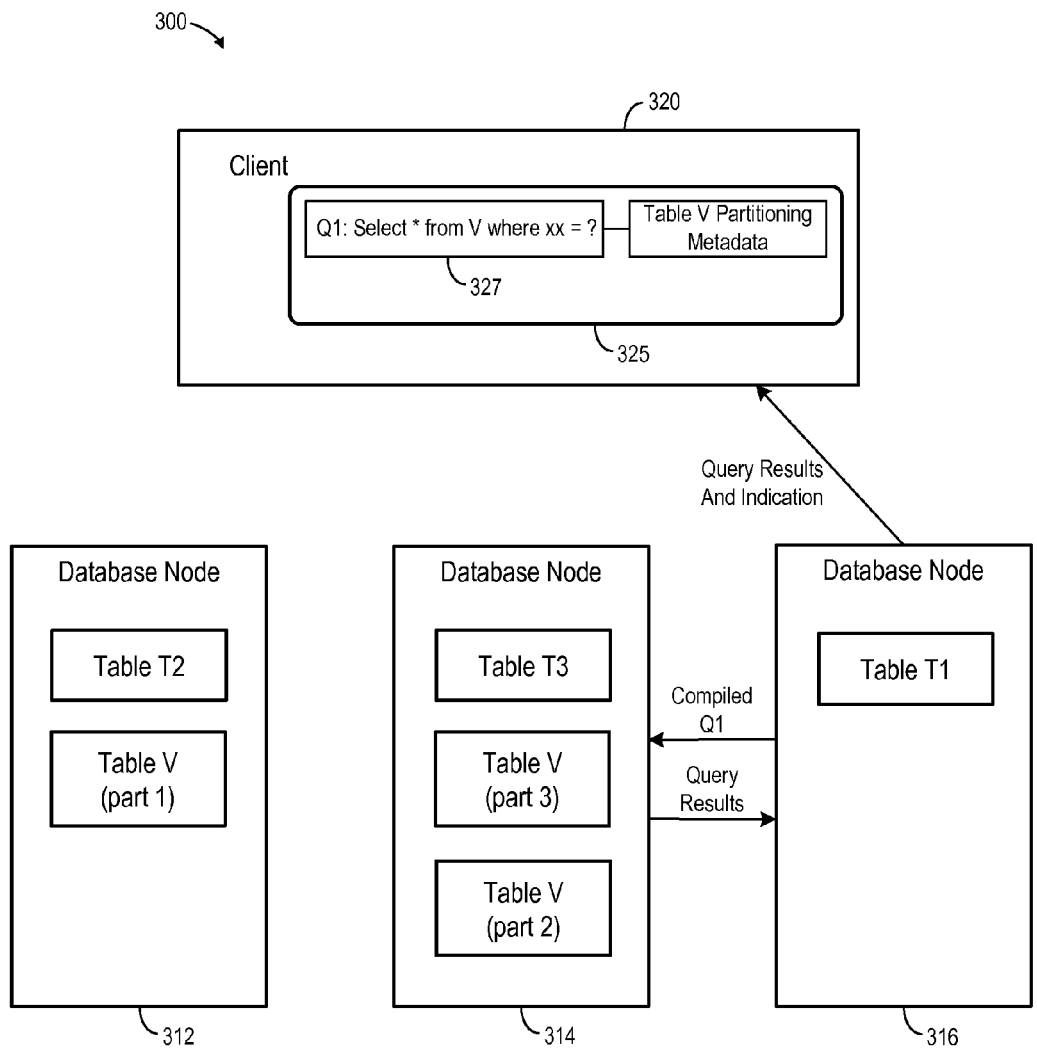
FIG. 14 is a block diagram illustrating operation of a system according to some embodiments.

Database node 316 may then execute process 700 as described above. Briefly, the compiled code is received, the compiled code is transmitted to the database node which manages the relevant data (i.e., node 314), query results are received, and the query results are transmitted back to the client as shown in FIG. 14. Also transmitted is an indication to update routing information for the compiled code. According to some embodiments, the indication is an invalidation flag returned with the query results. In some embodiments, the indication comprises updated routing information such as new partitioning metadata.

Figure 15:
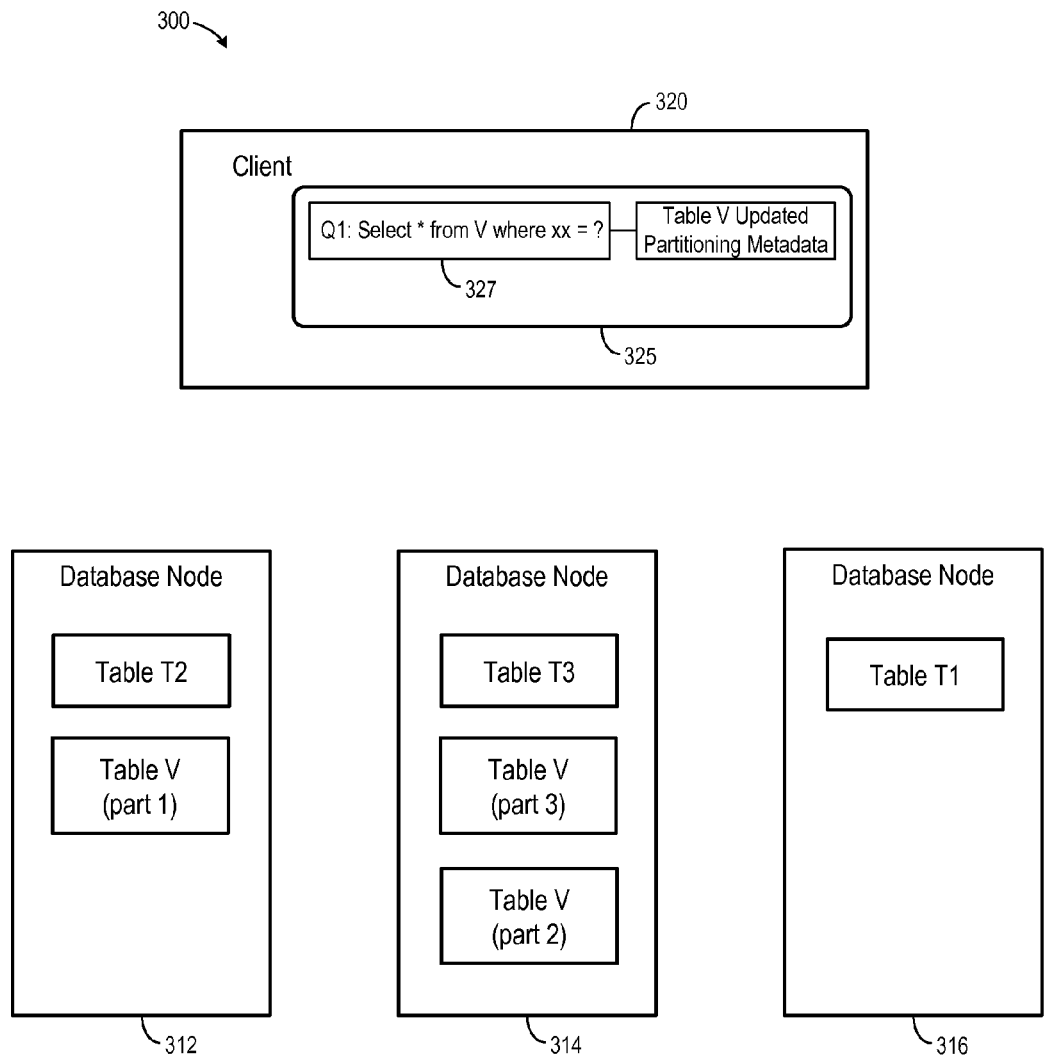
FIG. 15 is a block diagram illustrating operation of a system according to some embodiments.

The query results and indication are received at S280 of process 200. If the received indication itself includes updated routing information, client 320 may simply update the routing information associated with the compiled code within library 325 as shown in FIG. 15. In a case that the indication is an invalidation flag, client 320 may delete the associated routing information, and perhaps also the associated compiled code, from library 325 as described above.

Figure 16:
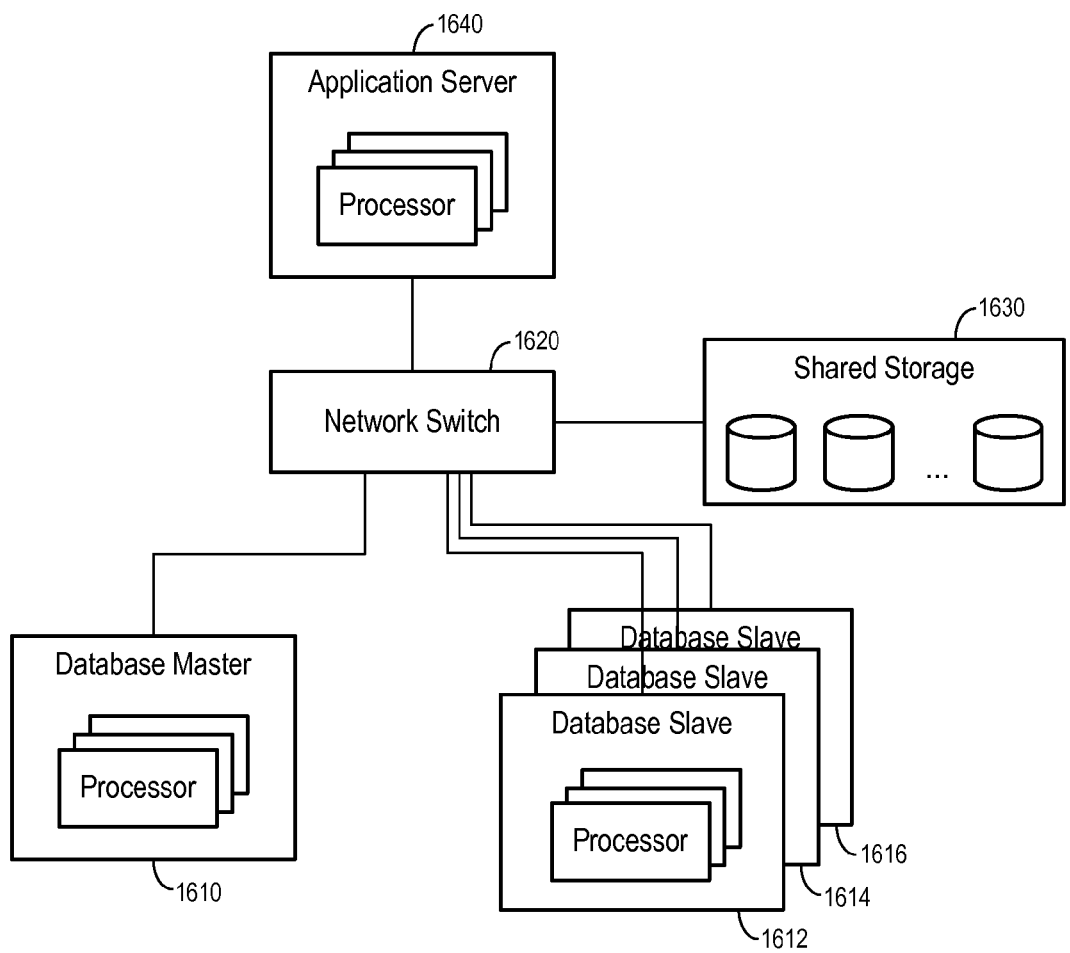
FIG. 16 is a block diagram of a hardware system according to some embodiments.

FIG. 16 is a block diagram of system 1600 according to some embodiments. System 1600 illustrates one hardware architecture implementing system 100 and/or 300 as described above, but implementations of either system 100 or 300 are not limited thereto. Elements of system 1600 may therefore operate to execute process 200 and/or 700 as described above.

Database master 1610 and each of database slaves 1612, 1614 and 1616 may comprise a multi-processor "blade" server. Each of database master 1610 and database slaves 1612, 1614 and 1616 may operate as described herein with respect to database nodes, and database master 1610 may perform additional transaction management functions and other master server functions which are not performed by database slaves 1612, 1614 and 1616 as is known in the art.

Database master 1610 and database slaves 1612, 1614 and 1616 are connected via network switch 1620, and are thereby also connected to shared storage 1630. Shared storage 1630 and all other memory mentioned herein may comprise any appropriate non-transitory storage device, including combinations of magnetic storage devices (e.g., magnetic tape, hard disk drives and flash memory), optical storage devices, Read Only Memory (ROM) devices, etc.

Shared storage 1630 may comprise the persistent storage of a database instance distributed among database master 1610 and database slaves 1612, 1614 and 1616. As such, various portions of the data within shared storage 1630 may be allotted (i.e., managed by) one of database master 1610 and database slaves 1612, 1614 and 1616.

Application server 1640 may also comprise a multi-processor blade server. Application server 1640, as described above, may execute database applications to provide functionality to end users operating user devices. Application server 1640 may also execute process 300 to store compiled query code and associated node identifiers in local memory (not shown) for use in routing and executing database queries.

Embodiments described herein are solely for the purpose of illustration. Those in the art will recognize other embodiments may be practiced with modifications and alterations to that described above.

What is claimed is:

1. A method implemented by a computing system in response to execution of program code by a processor of the computing system, the method comprising:

receiving a first query from a client device at a first database node of a database instance comprising two or more database nodes;

determining that a second one of the two or more database nodes is associated with the first query;

determining routing information associated with the first query, the routing information comprising an identifier of the second one of the two or more database nodes;

compiling the first query at the first database node to generate first compiled code;

transmitting the first compiled code and the routing information to the client device;

receiving the compiled code from the client device at the second one of the two or more database nodes;

determining, at the second one of the two or more database nodes, that data associated with the compiled query is associated with a third one of the two or more database nodes;

transmitting the compiled code from the second one of the two or more database nodes to the third one of the two or more database nodes;

receiving query results at the second one of the two or more database nodes from the third one of the two or more database nodes;

transmitting the query results and an indication to update the routing information from the second one of the two or more database nodes to the client device;

receiving a second query from the client device;

determining second routing information associated with the second query;

compiling the second query to generate second compiled code;

transmitting the second compiled code and the second routing information to the client device;

receiving the second compiled code from the client device at the third one of the two or more database nodes;

determining, at the third one of the two or more database nodes, that data associated with the second compiled query is associated with the second one of the two or more database nodes;

transmitting the second compiled code from the third one of the two or more database nodes to the second one of the two or more database nodes;

receiving second query results at the third one of the two or more database nodes from the second one of the two or more database nodes; and transmitting the second query results and an indication to update the second routing information from the third one of the two or more database nodes to the client device.

2. The method according to claim 1, wherein the indication comprises a second identifier of the third database node.

3. The method according to claim 1, wherein the second routing information comprises partitioning metadata of a first database table associated with the second query, the first partitioning metadata usable to identify one of the two or more database nodes based on table key values.

4. The method according to claim 1, wherein the second routing information comprises partitioning metadata of a first database table associated with the query, the first partitioning metadata usable to identify one of the two or more database nodes based on table key values.

5. The method according to claim 4, wherein the partitioning metadata comprises:
   a partitioning criteria function having input parameters associated with table keys; and
   for each partition of the first database table, an associated identifier of a database node storing the partition.

6. A non-transitory medium storing computer-executable program code, the program code executable by a computing device to:
   receive a first query from a client device at a first database node of a database instance comprising two or more database nodes;
   determine that a second one of the two or more database nodes is associated with the first query;
   determine routing information associated with the first query, the routing information comprising an identifier of the second one of the two or more database nodes;
   compile the first query at the first database node to generate first compiled code;
   transmit the first compiled code and the routing information to the client device;
   receive the compiled code from the client device at a second one of the two or more database nodes;
   determine, at the second one of the two or more database nodes, that data associated with the compiled query is associated with a third one of the two or more database nodes;
   transmit the compiled code from the second one of the two or more database nodes to the third one of the two or more database nodes;
   receive query results at the second one of the two or more database nodes from the third one of the two or more database nodes;
   transmit the query results and an indication to update the routing information from the second one of the two or more database nodes to the client device;
   receive a second query from the client device;
   determine second routing information associated with the second query;
   compile the second query to generate second compiled code;
   transmit the second compiled code and the second routing information to the client device;
   receive the second compiled code from the client device at the third one of the two or more database nodes;
   determine, at the third one of the two or more database nodes, that data associated with the second compiled query is associated with the second one of the two or more database nodes;
   transmit the second compiled code from the third one of the two or more database nodes to the second one of the two or more database nodes;
   receive second query results at the third one of the two or more database nodes from the second one of the two or more database nodes; and
   transmit the second query results and an indication to update the second routing information from the third one of the two or more database nodes to the client device.

7. The medium according to claim 6, wherein the indication comprises a second identifier of the third database node.

8. The medium according to claim 6, wherein the second routing information comprises partitioning metadata of a first database table associated with the second query, the first partitioning metadata usable to identify one of the two or more database nodes based on table key values.

9. The medium according to claim 6, wherein the routing information comprises partitioning metadata of a first database table associated with the query, the first partitioning metadata usable to identify one of the two or more database nodes based on table key values.

10. The medium according to claim 9, wherein the partitioning metadata comprises:
    a partitioning criteria function having input parameters associated with table keys; and
    for each partition of the first database table, an associated identifier of a database node storing the partition.

11. A system comprising:
    a client device comprising a processor and a memory;
    a first database node comprising a first processor and a first memory;
    a second database node comprising a second processor and a second memory, the second database node to:
      receive a first query from the client device;
      determine that a second one of the two or more database nodes is associated with the first query;
      determine routing information associated with the first query, the routing information comprising an identifier of the second one of the two or more database nodes;
      compile the first query to generate first compiled code; and
      transmit the first compiled code and the routing information to the client device,
    wherein the first database node is to:

receive the compiled code from the client device;
determine that data associated with the compiled query is associated with a third database node;
transmit the compiled code to the third database node;
receive query results from the third database node;
transmit the query results and an indication to update the routing information to the client device;
receive a second query from the client device;
determine second routing information associated with the second query;
compile the second query to generate second compiled code;
transmit the second compiled code and the second routing information to the client device;
receive the second compiled code from the client device at the third one of the two or more database nodes;
determine, at the third one of the two or more database nodes, that data associated with the second compiled query is associated with the second one of the two or more database nodes;
transmit the second compiled code from the third one of the two or more database nodes to the second one of the two or more database nodes;
receive second query results at the third one of the two or more database nodes from the second one of the two or more database nodes; and
transmit the second query results and an indication to update the second routing information from the third one of the two or more database nodes to the client device.

12. The system according to claim 11, wherein the indication comprises a second identifier of the third database node.

13. The system according to claim 11, wherein the routing information comprises partitioning metadata of a first database table associated with the query, the first partitioning metadata usable to identify one of the two or more database nodes based on table key values.

14. The system according to claim 13, wherein the partitioning metadata comprises:
a partitioning criteria function having input parameters associated with table keys; and
for each partition of the first database table, an associated identifier of a database node storing the partition.

* * * * *